(12) United States Patent
Coffey et al.

(10) Patent No.: US 9,055,841 B2
(45) Date of Patent: Jun. 16, 2015

(54) PACKAGE HEATING APPARATUS

(75) Inventors: Brendan Coffey, Austin, TX (US); Donald R. Schropp, Jr., Austin, TX (US); Krzysztof Czeslaw Kwiatkowski, Austin, TX (US)

(73) Assignee: HEATGENIE, INC., Austin, TX (US)

( * ) Notice: Subject to any disclaimer, the term of this patent is extended or adjusted under 35 U.S.C. 154(b) by 1068 days.

(21) Appl. No.: 12/715,330

(22) Filed: Mar. 1, 2010

(65) Prior Publication Data

US 2010/0252023 A1    Oct. 7, 2010

Related U.S. Application Data

(63) Continuation-in-part of application No. 12/419,917, filed on Apr. 7, 2009, now Pat. No. 8,864,924.

(51) Int. Cl.
| | | |
|---|---|---|
| *F24J 1/00* | (2006.01) | |
| *A47J 36/28* | (2006.01) | |
| *B65D 81/34* | (2006.01) | |

(52) U.S. Cl.
CPC ............. *A47J 36/28* (2013.01); *B65D 81/3484* (2013.01); *F24J 1/00* (2013.01)

(58) Field of Classification Search
CPC ............... F24J 1/00; A47J 36/28; A47J 36/30
USPC .................. 126/263.01, 263.05, 262; 426/113
See application file for complete search history.

(56) References Cited

U.S. PATENT DOCUMENTS 2,020,292 A * 11/1935 Eggert et al. ................... 126/262
2,384,278 A *  9/1945 Caldwell ........................ 426/113
2,490,327 A * 12/1949 Soffel ............................. 149/41
2,953,443 A    9/1960 Lloyd
2,997,165 A *  8/1961 Leuthy et al. ................. 206/568

(Continued)

FOREIGN PATENT DOCUMENTS

| AT | 443465 T | 10/2009 |
|---|---|---|
| AU | 2003-256246 A1 | 11/2003 |

(Continued)

OTHER PUBLICATIONS

Prentice, Daniel. "Synthesis and Performance Characterization of a Nanocomposite Ternary Thermite: Al/Fe2O3/SiO2." Feb. 7, 2005. Accessed Dec. 12, 2014. https://e-reports-ext.llnl.gov/pdf/316193.pdf.*

*Primary Examiner* — Jorge Pereiro
(74) *Attorney, Agent, or Firm* — DuBois, Bryant & Campbell LLP; William D. Wiese

(57) ABSTRACT

A solid state thermite reaction composition is provided comprising a fuel component, an initiating oxidizer, a primary oxidizer, a fluxing agent and a thermal diluent. According to other aspects, a heating device, a heating element and an activation mechanism are provided. The heating device comprises a heating chamber defining an interior space for receiving and storing a substance to be heated, a reaction chamber disposed within the heating chamber, a solid state thermite reaction composition disposed within the reaction chamber such that it is physically isolated from and in thermal communication with the interior space of the heating chamber, and an activation mechanism having an actuator. The activation mechanism is in communication with the composition disposed within the reaction chamber and the reaction composition is inert until the activator mechanism is actuated.

20 Claims, 9 Drawing Sheets

(56) References Cited

U.S. PATENT DOCUMENTS

| | | | | |
|---|---|---|---|---|
| 3,094,981 | A | * | 6/1963 | Brewer .................... 126/263.05 |
| 3,374,926 | A | * | 3/1968 | Friedenberg et al. ............. 222/1 |
| 3,386,334 | A | * | 6/1968 | Temple et al. ................. 89/1.14 |
| 3,399,663 | A | * | 9/1968 | Klaiber ........................ 126/262 |
| 3,527,201 | A | * | 9/1970 | Epstein .................... 126/263.01 |
| 3,662,741 | A | * | 5/1972 | Licher ..................... 126/263.01 |
| 3,980,070 | A | | 9/1976 | Krupa |
| 4,013,061 | A | * | 3/1977 | Trumble et al. ................. 44/250 |
| 4,043,314 | A | * | 8/1977 | Trumble et al. ......... 126/263.01 |
| 4,158,084 | A | * | 6/1979 | Prentice ........................ 429/112 |
| 4,301,035 | A | * | 11/1981 | Risse ............................ 502/256 |
| 4,464,989 | A | * | 8/1984 | Gibson et al. ................. 102/202 |
| 4,506,654 | A | * | 3/1985 | Zellweger et al. ............ 126/262 |
| 4,658,886 | A | | 4/1987 | Carlson et al. |
| 4,773,389 | A | * | 9/1988 | Hamasaki ................ 126/263.07 |
| 4,819,612 | A | * | 4/1989 | Okamoto et al. ......... 126/263.01 |
| 4,949,702 | A | * | 8/1990 | Suzuki et al. ............ 126/263.01 |
| 4,981,130 | A | * | 1/1991 | Suzuki et al. ............ 126/263.01 |
| 4,989,515 | A | * | 2/1991 | Kelly et al. ................ 102/202.9 |
| 4,996,922 | A | * | 3/1991 | Halcomb et al. ............. 102/205 |
| 5,012,795 | A | * | 5/1991 | Suzuki et al. ................. 126/262 |
| 5,018,505 | A | * | 5/1991 | Suzuki et al. ................. 126/262 |
| 5,020,509 | A | * | 6/1991 | Suzuki et al. ......... 126/263.01 |
| 5,213,730 | A | * | 5/1993 | Hida ............................ 264/624 |
| 5,220,908 | A | * | 6/1993 | Iizuna et al. ............ 126/263.01 |
| 5,299,556 | A | * | 4/1994 | Ando ....................... 126/263.01 |
| 5,593,792 | A | * | 1/1997 | Farrier et al. .................... 429/8 |
| 5,626,022 | A | * | 5/1997 | Scudder et al. ...................... 62/4 |
| 5,650,590 | A | | 7/1997 | Taylor |
| 5,700,974 | A | | 12/1997 | Taylor |
| 5,941,078 | A | * | 8/1999 | Scudder et al. ...................... 62/4 |
| 5,979,164 | A | * | 11/1999 | Scudder et al. ...................... 62/4 |
| 6,029,651 | A | * | 2/2000 | Dorney .................... 126/263.07 |
| 6,099,806 | A | * | 8/2000 | Cortellucci et al. ........... 422/126 |
| 6,134,894 | A | * | 10/2000 | Searle et al. ...................... 62/62 |
| 6,141,970 | A | * | 11/2000 | Molzahn et al. .................... 62/4 |
| 6,178,753 | B1 | * | 1/2001 | Scudder et al. ...................... 62/4 |
| 6,196,584 | B1 | * | 3/2001 | Shirk et al. .................... 280/737 |
| 6,248,257 | B1 | * | 6/2001 | Bell et al. ........................ 252/70 |
| 6,267,110 | B1 | * | 7/2001 | Tenenboum et al. .... 126/263.01 |
| 6,328,943 | B1 | | 12/2001 | Roling et al. |
| 6,539,869 | B2 | * | 4/2003 | Knowlton et al. ......... 102/275.3 |
| 6,627,013 | B2 | | 9/2003 | Carter |
| 6,705,309 | B2 | * | 3/2004 | Searle et al. ............. 126/263.06 |
| 6,986,345 | B2 | | 1/2006 | Kolb |
| 7,004,161 | B2 | * | 2/2006 | Kolb ...................... 126/263.09 |
| 7,117,684 | B2 | * | 10/2006 | Scudder et al. ...................... 62/4 |
| 7,350,362 | B2 | * | 4/2008 | Danwoody ......................... 62/4 |
| 7,721,556 | B2 | | 5/2010 | Guida |
| 7,878,187 | B2 | * | 2/2011 | York-Leung Wong .. 126/263.01 |
| 7,878,188 | B2 | * | 2/2011 | Barksdale ............... 126/263.09 |
| 8,001,959 | B2 | * | 8/2011 | Ford et al. ............... 126/263.09 |
| 8,038,813 | B2 | * | 10/2011 | Lechner et al. ........... 149/109.4 |
| 2003/0145752 | A1 | | 8/2003 | Carter |
| 2003/0145924 | A1 | | 8/2003 | Carter |
| 2004/0206346 | A1 | * | 10/2004 | Tenenboum et al. .... 126/263.06 |
| 2004/0211407 | A1 | * | 10/2004 | Terashima et al. ............ 126/400 |
| 2004/0234914 | A1 | * | 11/2004 | Hale et al. ...................... 431/269 |
| 2005/0079166 | A1 | * | 4/2005 | Damani et al. ................ 424/122 |
| 2006/0086097 | A1 | | 4/2006 | Guida |
| 2007/0034201 | A1 | * | 2/2007 | Lechner et al. .......... 126/263.01 |
| 2007/0164253 | A1 | | 7/2007 | Iannicelli |
| 2007/0204851 | A1 | * | 9/2007 | Justo ............................. 126/262 |
| 2008/0251063 | A1 | | 10/2008 | Palena et al. |
| 2009/0250189 | A1 | * | 10/2009 | Soukhojak et al. ............. 165/10 |
| 2009/0293859 | A1 | * | 12/2009 | Coffey et al. ............ 126/263.01 |
| 2010/0068155 | A1 | * | 3/2010 | Lei et al. ......................... 424/40 |
| 2010/0078440 | A1 | * | 4/2010 | Bargan et al. .............. 220/592.2 |
| 2010/0206889 | A1 | | 8/2010 | Canela Mercade |
| 2011/0240656 | A1 | | 10/2011 | Widitora et al. |

FOREIGN PATENT DOCUMENTS

| | | |
|---|---|---|
| AU | 2003-256246 A8 | 11/2003 |
| AU | 2002-337621 A1 | 3/2004 |
| AU | 2002-337621 B2 | 11/2008 |
| BR | 0215860 A | 7/2005 |
| CA | 2496377 A1 | 3/2004 |
| CA | 2496377 C | 9/2009 |
| CN | 1668513 A | 9/2005 |
| CN | 100503391 C | 6/2009 |
| DE | 60214443-D1 | 10/2006 |
| DE | 60214443 T2 | 3/2007 |
| DE | 602006009419-D1 | 5/2007 |
| EP | 0255494 A1 | 2/1988 |
| EP | 0764621 A2 | 3/1997 |
| EP | 0764621 A3 | 3/1998 |
| EP | 1534607 A1 | 6/2005 |
| EP | 1534607 B1 | 8/2006 |
| EP | 1811008 A2 | 7/2007 |
| EP | 1956950 A2 | 8/2008 |
| EP | 1956950 B1 | 9/2009 |
| EP | 1811008 A3 | 12/2009 |
| ES | 2271336 T3 | 4/2007 |
| JP | 62-146427 A | 6/1987 |
| JP | 09-118581 A | 5/1997 |
| JP | 02-049613 A | 2/2002 |
| JP | 2002-363544 A | 12/2002 |
| JP | 03-140116 A | 5/2003 |
| JP | 03-218715 A | 7/2003 |
| JP | 05-035025 A | 2/2005 |
| JP | 2005-537999 A | 12/2005 |
| JP | 04105162 B2 | 6/2008 |
| JP | 2009-515785 A | 4/2009 |
| KR | 10-0877454 B1 | 1/2009 |
| MX | PA05002375 A | 9/2005 |
| UA | 79011 C2 | 5/2007 |
| WO | WO-03-093402 A2 | 11/2003 |
| WO | WO-03-093402 A3 | 11/2003 |
| WO | WO-2004-022450 A1 | 3/2004 |
| WO | WO-2007-059122 A1 | 5/2007 |
| WO | WO-2007-059151 A2 | 5/2007 |
| WO | WO-2007-059151 A3 | 9/2007 |

* cited by examiner

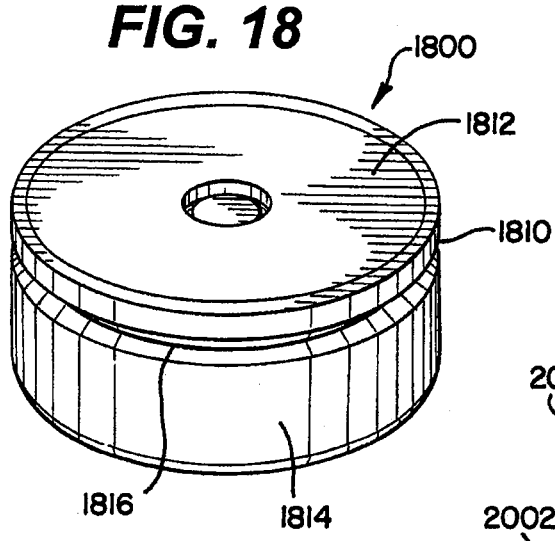
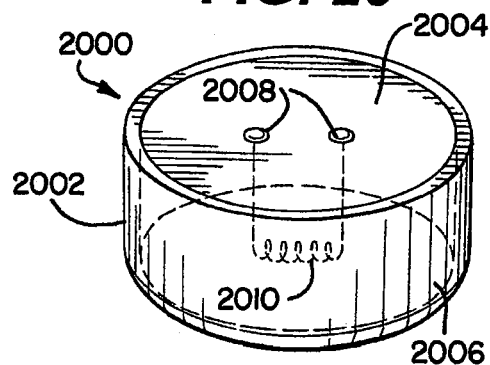
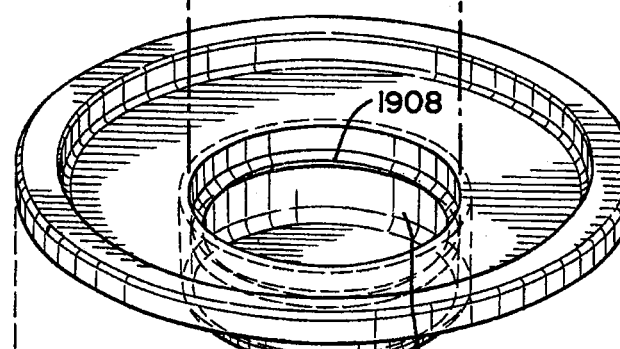

PACKAGE HEATING APPARATUS

CROSS-REFERENCE TO RELATED APPLICATIONS

This application is a continuation-in-part of application Ser. No. 12/419,917, filed Apr. 7, 2009, which is incorporated herein by reference in its entirety to provide continuity of disclosure. Additionally, this application contains subject matter that relates to subject matter disclosed in application Ser. No. 12/570,822, filed on Sep. 30, 2009, which is also incorporated herein by reference in its entirety.

TECHNICAL FIELD

This disclosure relates to precisely controlled solid state thermite reaction compositions and incorporation of those compositions into heating apparatus for various applications such as heating of prepared foods or beverages in their containers.

BACKGROUND OF THE INVENTION

Situations arise in which it would be convenient to have a distributed means of providing heat in circumstances where heating appliances are not available. For example, producers of prepared foods have indicated that there could be significant market potential for self-heating food packaging (SHFP) systems that could heat prepared foods in their containers to serving temperature, simply, safely, and efficiently.

For a mass consumer SHFP product, safety is paramount and should be inherent; preferably there should be no extreme temperatures, no fire, no smoke or fumes under anticipated use and abuse conditions. Practical considerations mandate that any system be reasonably compact and lightweight with respect to the food to be heated. Thus, the system should have a good specific energy and high efficiency. The system must also be capable of extended storage without significant loss of function or accidental activation of the heater. There should be some simple means of activating the heating component of the system, after which the required heat load should be delivered efficiently within a specified time period, perhaps just a few minutes. Operation must be very reliable with low failure rates in millions of units of production. For a single use food application, material components should be food-safe, low-cost, environmentally friendly and recyclable.

The only SHFP technology currently in the consumer market uses an onboard system for mixing separated compartments of quicklime and water, yielding an exothermic heat of solution. These products are bulky (literally doubling package size and weight), complex, unreliable, costly, and have achieved very low market penetration. There have also been reported instances of the heater solution leaking and coming into contact with food or consumers.

An exothermic reaction in which the component reactants could be premixed yet be inert until such time as the user initiates the reaction would be beneficial in terms of providing for a simpler, more compact, and low cost package design. A solid state reaction system could offer advantage over wet chemical systems since solid systems will be less prone to spill or leak.

Thermites are a class of exothermic solid-state reactions in which a metal fuel reacts with an oxide to form the more thermodynamically stable metal oxide and the elemental form of the original oxide. Thermites are formulated as a mechanical mix of the reactant powders in the desired stoichiometric ratio. The powders may be compressed into a unitary mass. These compact reactions generate substantial heat, with system temperatures that can reach several thousand degrees, often high enough to melt one or more of the reagents involved in the reaction. However, thermite reactions typically require a very high activation energy (e.g., welding thermites [Al/FeO$_x$] are ignited with a burning magnesium ribbon). Thus, a thermite reagent composition can be formulated to be quite stable to prevent inadvertent initiation due to electrostatic shock or mechanical impact. This generally inert character is an advantage in storage and transportation.

The most widely known thermite system is the Al/FeO$_x$ system described in Table 1. Once initiated, this system reacts virtually instantaneously to generate molten iron and is in fact used for welding rail lines. The only other significant known applications of thermites are in pyrotechnics and military weapons technologies. "A Survey of Combustible Metals, Thermites, and Intermetallics for Pyrotechnic Applications," S. H. Fischer, M. C. Grubelich, *Proc. Of 32$^{nd}$ AIAA/ASME/SAE/ASEE Joint Propulsion Conference* (1996) and "Thermite Reactions: their utilization in the synthesis and processing of materials," L. L. Wang, Z. A. Munir, Y. M. Maximov, *Journal of Material Science* 28(14), 3693-3708 (1993) provide useful surveys of various classes of solid state reactions including thermites.

TABLE 1

Characteristics of FeOx/Al and SiO2/Al Thermite Reactions

| Reaction | Density (g cm$^{-3}$) | Heat of reaction (kJ g$^{-1}$) | Adiabatic Reaction Temperature (K) | State of Products | Gas production (moles of gas per 100 g) |
|---|---|---|---|---|---|
| 2 Al + Fe$_2$O$_3$ → 2 Fe + Al$_2$O$_3$ | 4.175 | 3.95 | 3135 (2862° C.) | molten Al$_2$O$_3$ slag Fe (liq./gas) | 0.1404 |
| 8 Al + 3Fe$_3$O$_4$ → 9 Fe + 4 Al$_2$O$_3$ | 4.264 | 3.67 | 3135 (2862° C.) | Molten Al$_2$O$_3$ slag Fe (liq./gas) | 0.0549 |
| 4 Al + 3 SiO$_2$ → 3 Si + 2 Al$_2$O$_3$ | 2.668 | 2.15 | 1889 (1616° C.) | solid Al$_2$O$_3$ Si (liq.) | 0 |

Since thermite reactions are generally vigorous with intense heat, they have not yet been successfully adapted for moderate-temperature consumer applications. Therefore, it would be highly beneficial to harness the energy release from a kinetically moderated thermite reaction thus transforming a reaction with generally pyrotechnic character to a precisely controlled power source for thermal energy and to then integrate that thermal energy into a heating device for consumer applications.

SUMMARY OF THE INVENTION

In addition to the chemical composition aspects, package heating apparatus and related aspects are provided.

According to a particular aspect, a heating device is provided comprising a heating chamber defining an interior space for receiving and storing a substance to be heated, a reaction chamber disposed within the heating chamber, a solid state thermite reaction composition disposed within the reaction chamber such that it is physically isolated from and in thermal communication with the interior space of the heating chamber, and an activator mechanism having an actuator. The activator mechanism is in communication with the composition disposed within the reaction chamber and the reaction composition is inert until the activator mechanism is actuated.

According to another aspect, a heating element is provided for use as a source of heat. The heating element comprises a housing defining an exterior shape of the heating element and an interior space, a solid-state chemical heating composition disposed within the interior space, and an activation mechanism in communication with the composition and having an actuator and disposed within the housing such that the actuator is actuable exteriorly from the housing. The activation mechanism initiates a chemical reaction within the composition when actuated.

According to yet another aspect, an activation mechanism is provided for a heating element containing a solid-state chemical composition. The activation mechanism comprises an actuator having a user interface portion and an actuation portion. The actuation portion carries a reaction initiation material that, when assembled with the heating element, is capable of initiating a chemical reaction in the chemical composition when the actuation portion is actuated by a user.

Other aspects will be apparent to those of ordinary skill in the art.

BRIEF DESCRIPTION OF THE DRAWINGS

To understand the present invention, it will now be described by way of example, with reference to the accompanying drawings in which:

FIG. 18 is a perspective view of a particular embodiment of a modular heating element;

FIG. 19 is an exploded assembly view of a particular embodiment of an end portion of a package heating apparatus having a formation to accommodate the modular heating element embodiment of FIG. 18; and FIG. 20 is a perspective view of a particular embodiment of a modular heating element utilizing a resistive heating activation assembly.

DETAILED DESCRIPTION OF EXEMPLARY EMBODIMENTS

Figure 1:
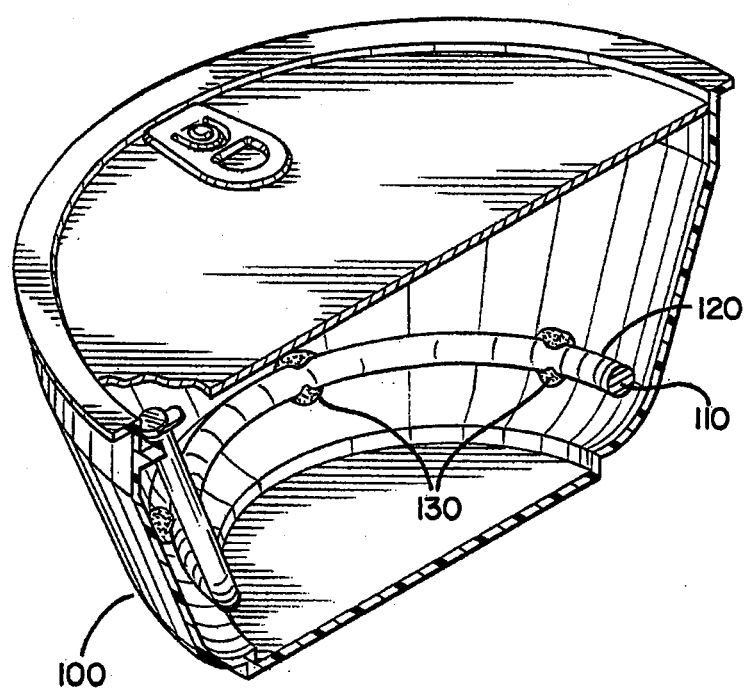
FIG. 1 is a perspective cross-sectional view of an illustrative embodiment of a food packaging application with an integrated solid-state thermite heating element.

The description that follows describes, illustrates and exemplifies one or more particular embodiments of the present invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. The present specification is intended to be taken as a whole and interpreted in accordance with the principles of the present invention as taught herein and understood to one of ordinary skill in the art.

Food safety and cost are two primary considerations in the selection of potential materials for use in the illustrative embodiments described herein. The Al/FeO$_x$ and Al/SiO$_2$ thermites described in Table 1 involve only abundant, low-cost, food-safe materials and are therefore in this regard good candidates for SHFP. However, those of ordinary skill in the art will understand that many different materials could be selected without departing from the novel scope of the present invention.

Table 1 compares various characteristics of Al/FeO$_x$ and Al/SiO$_2$ thermite systems. In both cases aluminum is the fuel, with either FeO$_x$ or SiO$_2$ as oxidizer. However the reaction character of the two systems are distinctly different. The high heat of reaction (3.8 kJ g$^{-1}$) of the Al/FeO$_x$ thermite leads to an adiabatic reaction temperature of over 3000 K (well above the melting point of both metals: T$_{M, Fe}$=1809 K, T$_{M, Al}$=933 K), with excess heat generating gases that can spew molten reaction product. The heat of reaction for Al/SiO$_2$ thermite is somewhat lower (2.15 kJ g$^{-1}$) leading to an adiabatic reaction temperature of only 1889 K. This temperature is insufficient to melt the alumina slag formed during reaction. This slag acts as a thickening barrier to mass transfer in this type of system, and thus, reduction in thermal propagation at the reaction front can quench the Al/SiO$_2$ thermite reaction.

The rate-limiting step in thermite reactions is typically diffusion of material to the reaction zone. Accordingly, heat transfer and mass transfer are closely coupled in determining reaction rate. Thermite kinetics are typically modeled as a combustion system in which a solid flame front moves through preheat, reaction and quench zones. For reaction self-propagation to occur, the heat generated in the reaction zone must trigger reaction ahead of the wave front. The parameter used to quantify reaction rate of thermites is combustion wave speed. These can range anywhere from approximately 1 m s$^{-1}$ for conventional thermites to greater than 1000 m s$^{-1}$ for superthermites based on nanoscale powdered reactants.

While reasonably exothermic, the Al/SiO$_2$ system is inherently both non-detonative and self-extinguishing. Based on this more controlled reaction character, this system comprises the foundation of the moderated thermite composition of the embodiments of the present invention described herein. In one embodiment the foundational solid state chemistry is modulated via a combination of physical and chemical reaction modifiers to prepare Al/SiO$_2$ thermite fuel formulations that are inherently self-regulating at an optimal bounded temperature and give high utilization of the chemical energy content of the reaction materials at the requisite rate of heating.

Another aspect of these embodiments is maximization of energy content in the solid thermite composition. "Mixed" thermites can be prepared, for example using a combination of oxidizers, and, as shown in Table 1, substituting any portion of the SiO$_2$ oxidizer with FeO$_x$ to create a ternary system, which can beneficially increase the specific energy content of the system from approximately 2 to 4 kJ g$^{-1}$ depending on FeO$_x$ content. Aluminum, SiO$_2$, and iron oxides are readily available in various commercial powder grades with food grade purity.

Factors that can be altered to adjust the reaction rate and combustion temperature of thermite systems include: particle size of reactants, composition, diluent (inert) additives, pre-combustion density, ambient pressure and temperature and physical and chemical stability of reactants.

Because mass diffusion is the rate controlling step for thermites and diffusion-controlled reactions are inherently slower than temperature dependent chemical kinetics, increasing the diffusion coefficient or reducing the diffusion length between fuel and oxidizer species within an energetic composite can be used to accelerate the reaction rate. Particle shape can be highly influential. Spherical particles can be undesirable if they are too reactive and result in excessive burn rates. Thin and flat-shaped particles can be more ideal for moderate temperature reactions. For efficient thermite fuel utilization, the solid-state reaction must be self-sustaining throughout its volume and there should not be extensive un-reacted regions. Those of ordinary skill in the art will understand that the degree and intimacy of mixing between the silica, aluminum, and additive constituents can be altered to satisfy a myriad of desired outcome parameters without departing from the novel scope of the present invention.

In a preferred embodiment of an Al/SiO$_2$ thermite fuel formulation as shown in Table 2 below, the thermite fuel is an aluminum flake. In order to achieve an appropriate balance of reactive surface area and relatively low thermal conductivity to reduce combustion rate, a portion of the silica used is fumed silica, which is in fact an agglomerated nanoparticulate that is easily dispersed into mixtures. Certain materials can act as a "coolant" to lower the burning temperature of the mixture and/or slow down the reaction rate. Other additives can act as binders or stabilizers to regulate mass and heat transfer. Accordingly, in a particular embodiment, a nanoscale clay material is used as a thermal buffer to moderate temperature. Other materials may be used as well.

In order to render self-sustaining character to the Al/SiO$_2$ system while operating at lower temperatures, an accelerant is incorporated to reduce the activation energy for the reaction or enable a lower energy reaction path. For example, as shown in Table 2, potassium chlorate, a strong oxidizer is used as an accelerant. Those of ordinary skill in the art will understand that there are many other possible chemical accelerants that could be incorporated without departing from the novel scope of the present invention. Further, the high boiling point, inert salt calcium fluoride is provided as a fluxing agent to increase the fluidity of the reacting system and thereby facilitate mass transport.

TABLE 2

Compositions in Weight Percent for Examples

| Component | Function | Example I (BC03A04) | Example II (BC12A02) |
|---|---|---|---|
| Flaked Aluminum powder (Toyal America 5621) | Fuel component | 17.9% | 17.3% |
| KClO$_3$ (Sigma-Aldrich 31247) | Initiating oxidizer | 14.3% | 13.8% |
| SiO$_2$ –325 mesh (Sigma-Aldrich 342890) | Oxidizer, dense form | 17.9% | 13.0% |
| Fumed silica (Sigma-S5130) | Oxidizer, high surface area form | 3.5% | 3.5% |
| CaF$_2$ (Sigma-Aldrich 31247) | Fluxing agent | 10.7% | 10.4% |
| Bentonite nanoclay (Aldrich 682659) | Thermal Diluent | 35.7% | 34.3% |
| Fe$_2$O$_3$ <5 micron (Sigma-Aldrich 31247) | High energy oxidizer | 0% | 7.7% |

The exemplary thermite fuel compositions described above were tested to determine their specific energy and reaction rate as follows:

EXAMPLE I

Specific Energy and Reaction Rate Determination on a Moderated Al/SiO$_2$ Thermite—Initiated by Hot Wire An approximately 30 g batch of the formulation in column 3 of Table 2 is prepared using the following steps. The powdered components are all first sieved through a 60-mesh screen and weighed in correct proportions into a mill jar. They are mixed in the jar by tumbling on a roll mill for 30 minutes.

Figure 10:
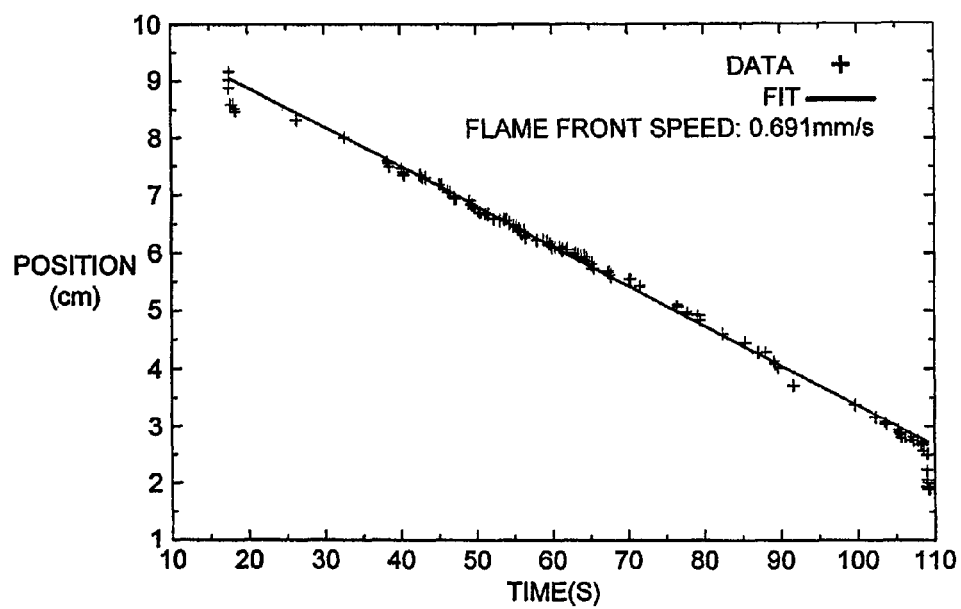
FIG. 10 is a graphical depiction of a least squares fit of thermite reaction front position versus time data.

As discussed previously, the rate of reaction and hence heat generation or power is a key metric for an energetic material in consumer heating applications. Kinetic measurements were made on the Example I material by flame tube experiments in which the energetic material is placed in a Pyrex tube and initiated with a hot wire. A video of the reaction is made and then the position data of the reaction front versus time are least square analyzed to extract reaction propagation velocity. FIG. 10 shows the reaction propagation velocity for the Example I material to be 0.691 mm s$^{-1}$. This low combustion rate is significantly below that previously reported for conventional thermite reactions and allows efficient calorimetric heat transfer to take place.

Figure 11:
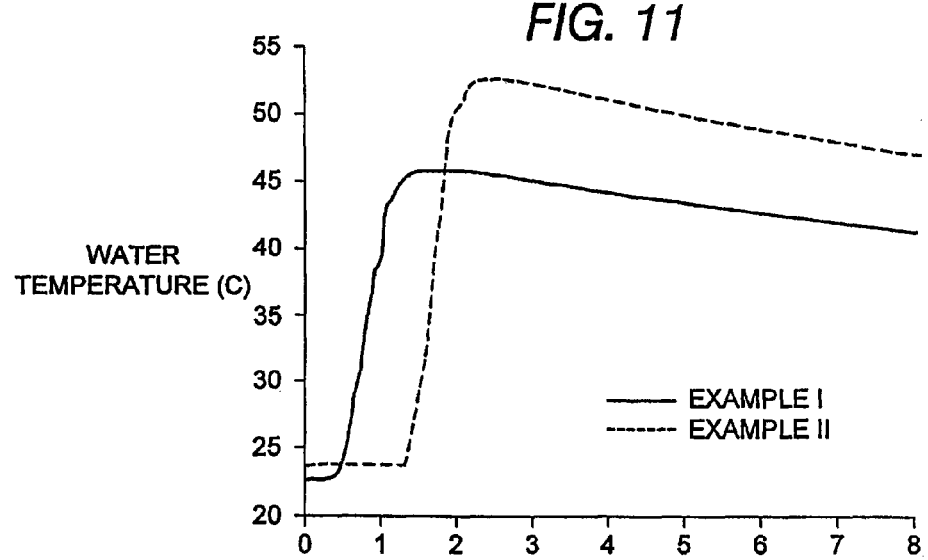
FIG. 11 is a graphical depiction of calorimetry data of solid-state thermite reactions.

Calorimetric data was measured on a sample prepared by packing approximately 7 g of the powder mix into an open top cylindrical steel can (14 mm diameter×50.5 mm high). The filled can is held immersed in a stirred beaker containing approximately 120 g of water. A small nichrome wire heating element connected to a current source is placed in contact with the upper surface of the packed powder. Current is passed momentarily to initiate the mix and then switched off. The temperature of the water vs. time is recorded, and the maximum temperature increase is used to calculate the thermal energy transferred to the water. The curve labeled Example I on FIG. 11 shows calorimetric time vs. temperature data on the Example I formulation. With the Example I formulation, it takes less than 2 minutes for the water to reach its peak temperature and deliver an energy content of 1.61 kJ g$^{-1}$.

EXAMPLE II

Specific Energy Determination on a Moderated Al/SiO$_2$ Thermite Containing Fe$_2$O$_3$—Initiated by Hot Wire Example II is prepared in a similar manner and tested as Example I except that some stoichiometric fraction of the SiO$_2$ in the formulation is replaced by Fe$_2$O$_3$ to yield the formulation given in Column 4 of Table 2. The curve labeled Example II on FIG. 11 shows calorimetric time vs. temperature data on the Example II formulation. The greater specific oxidizing power of the Fe$_2$O$_3$ substituent is evidenced by a higher peak temperature of the water. This corresponds to a transferred energy content of 1.76 kJ g$^{-1}$.

Another embodiment of the present invention is the inclusion of a means for activating a solid-fuel thermite composition. The solid fuel should not be prone to inadvertent activation, yet a simple means of activating the reactive material in the heater at the desired time of use is beneficial.

Figure 4:
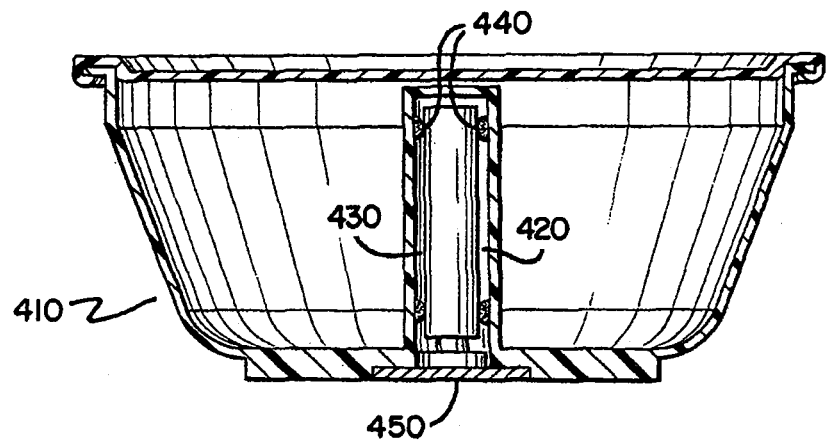
FIG. 4 is a side cross-sectional view of an illustrative embodiment of a re-useable bowl with a port to removably insert a solid-state thermite heating element.
Figure 5:
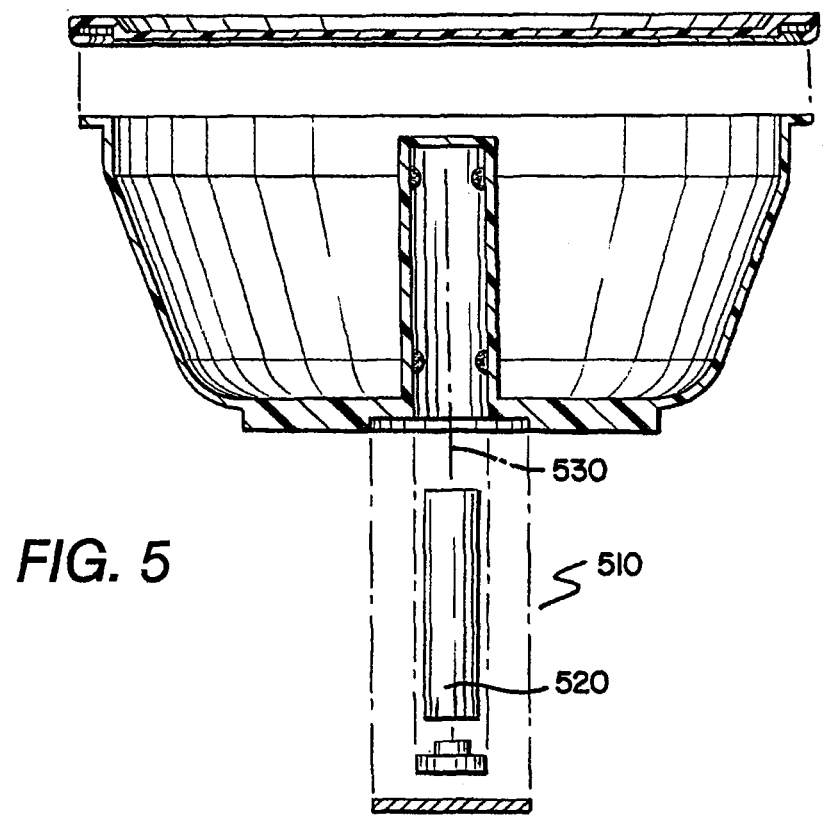
FIG. 5 is a side cross-sectional view of the embodiment of FIG. 4 with a re-useable activation mechanism removably attached.
Figure 9:
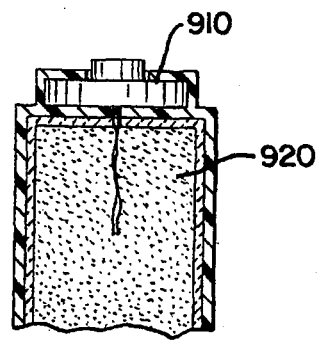
FIG. 9 is a side cross-sectional view of a solid-state thermite activation mechanism with a piezoelectric spark igniter.

In some embodiments, a more complex and costly activation device that is re-useable would couple to disposable heater elements for activation. For example, as shown in FIGS. 4 and 5, a re-useable container is provided with a re-useable activating device such as a battery powered hot wire or a piezoelectric spark igniter 910, as shown in FIG. 9. Referring to FIG. 4, a heating bowl 410 is provided with a port 420 to receive heating elements 430 containing a solid-state thermite fuel composition. The heating element 430 is held in place by holding tabs or standoffs 440. An activation device port 450 is provided on the bottom of the bowl to receive and temporarily attach a thermite activation device. The activation device could be a simple battery and wire device 510 as shown in FIG. 5. The battery 520 is connected to a wire 530 that can be extended through the activation device port 450 into the thermite fuel composition within the heating element 430. The battery can be used to send enough current down the wire to initiate a thermite reaction using the thermite fuel composition. In addition, the activation device could be a piezoelectric spark igniter 910 in communication with a thermite fuel composition 920 as shown in FIG. 9. Those of ordinary skill in the art will understand that many types of activation devices can be employed without departing from the novel scope of the present invention.

Figure 6:
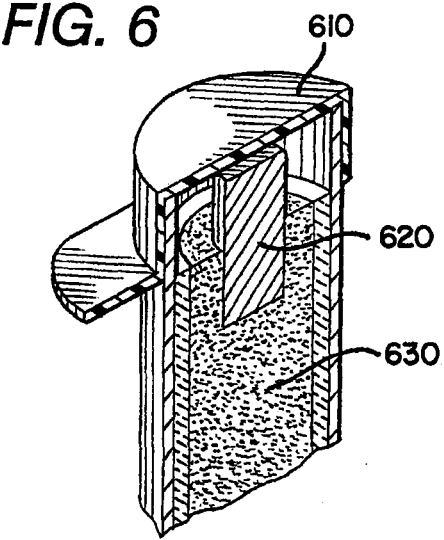
FIG. 6 is a perspective cross-sectional view of a solid-state thermite activation mechanism with a tear-off seal.
Figure 7:
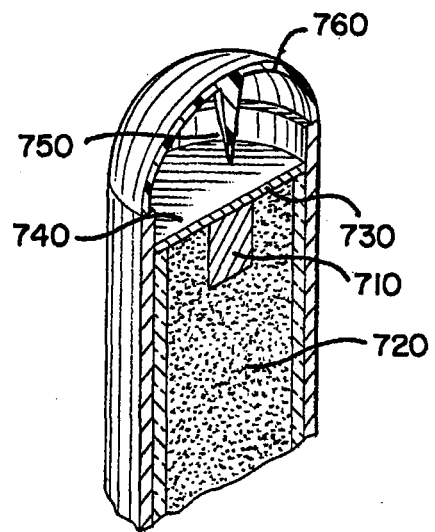
FIG. 7 is a perspective cross-sectional view of a solid-state thermite activation mechanism with a foil barrier and foil piercing element.
Figure 8:
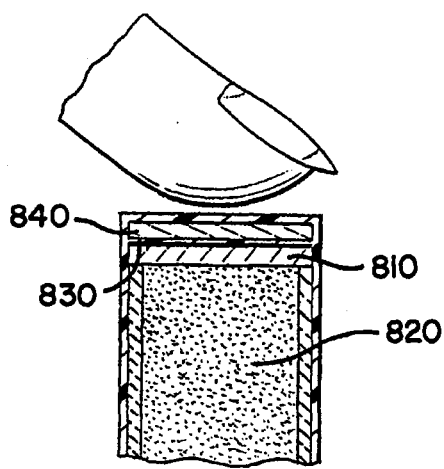
FIG. 8 is a side cross-sectional view of a solid-state thermite activation mechanism with a membrane coated with activation reagents on both sides.

In a particular embodiment that enables the greatest ease of use, a simple, low-cost, small (or even miniature) activation device as a built-in component of the heating device is provided. This embodiment is particularly useful in the disposable food packaging context. For example, as shown in FIGS. 6, 7 and 8, the activation device could be comprised of minute quantities of an exothermic A/B chemical couple separated by a partition. When the partition is breached mechanically by a simple action of the user, the reactive A/B components mix into contact with each other as well as with the bulk solid thermite fuel composition. Reaction of the A/B components generates a highly localized hot spot in contact with the fuel composition, thereby initiating its controlled combustion.

While those of ordinary skill in the art will understand that there are many exothermic couples that can be used, FIGS. 6, 7 and 8 show three designs that incorporate reagents which produce sufficient heat to activate thermite reactions. FIG. 6 shows a pyrophoric iron/air couple where the removal of an internal seal 610 exposes a small mass of pyrophoric iron 620, which is in contact with a solid thermite fuel composition 630, to the surrounding atmosphere. The pyrophoric iron reacts with the air to generate the requisite heat to initiate the thermite reaction.

A potassium permanganate/glycerin couple, as shown in FIG. 7, is easily prepared, low-cost and food safe while reliably generating very high temperatures with minute quantities of reagents. FIG. 7 shows an amount of potassium permanganate 710 placed directly onto the thermite fuel composition 720. An aluminum foil barrier 730 is placed over the potassium permanganate 710 and glycerin 740 is placed onto the foil. A cover 760 made of a malleable material with an integrated piercing member 750 is placed over the entire system. A user can then activate the mechanism by pressing down on the cover 760 thus pushing the piercing member 750 through the foil barrier 730, allowing the potassium permanganate 710 and glycerin 740 to mix and generate enough heat to initiate the thermite reaction.

This embodiment is capable of being produced in high volume based on a multi-laminate paper making process in which a thin septum layer is interposed between sheets coated with each reactant as shown in FIG. 8. As shown in FIG. 8, the potassium permanganate 810 and glycerin 840 are disposed on either side of a thin membrane 830. A user can rupture the membrane 830 by applying pressure thus allowing the potassium permanganate 810 and glycerin 840 to mix and contact the thermite fuel composition 820, thus initiating the desired thermite reaction.

A still further aspect of the present invention is integration of a heating element comprised of a thermite fuel composition and an activation mechanism into the packaging of a food product to be heated by a consumer. An appropriate design of package can be used in conjunction with the moderated composite fuel formulation to provide for ease of use and additional consumer safety. The solid-state fuel can be integrated into a package in a way that provides for efficient transfer of the heat generated to the material to be heated. To illustrate this aspect of the invention, several illustrative embodiments describing designs for incorporating solid fuel compositions into self-heating food packaging follow.

Figure 3:
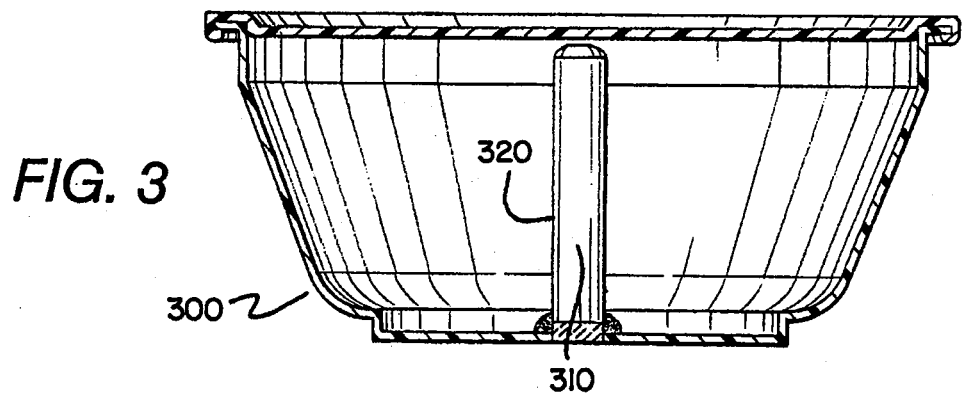
FIG. 3 is a side cross-sectional view of another illustrative embodiment of a food packaging application with an integrated solid-state thermite heating element.

FIGS. 1 and 3 show heater component designs that are suited to heating foods with a high fluid content, such as canned soups or beverages. In FIG. 1, the fuel composite 110 is packed into a metal tube 120 that is formed into the shape of a complete or partial annular ring to provide a heating surface near the bottom of the container 100 while at least one end of the tube is located near the top of the container to allow access for user activation of the device. In the alternative design of FIG. 3 the fuel composite 310 is packed into a cylindrical metal can 320 which is then affixed to the bottom of the container 300. However, those of ordinary skill in the art will understand that a myriad of heater component shapes can be used without departing from the novel scope of the present invention.

Figure 2:
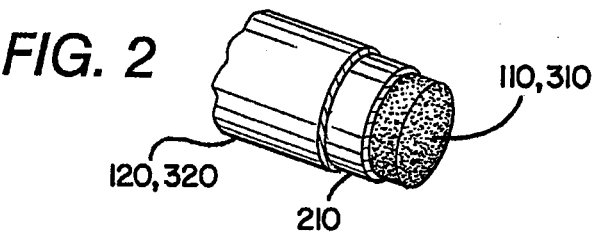
FIG. 2 is a perspective cross-sectional view of the heating element depicted in FIG. 1.

In both designs, the thin metal wall enclosing the fuel provides excellent heat transfer to the surrounding fluid and the simple constructions are amenable to low cost methods of manufacture. As shown in FIG. 2, the tube 120 or cylinder 320 can be lined with a ceramic layer 210 to provide more controlled heat transfer through the metal wall. Various means can be provided for closing the open ends of the packed cylinders so that the fuel materials will not come into direct contact with the food. The packed tubing may be held in place by stand-off mechanical contacts 130, such as for example welded tabs to the interior of the container, so that heat transfers efficiently to the surrounding fluid and heat losses to the exterior food container wall are minimized. The heater elements can be offset from the center in order to facilitate filling, stirring, and spooning material from the container. Those of ordinary skill in the art will understand that numerous methods for attaching or integrating the heating component into the packaging structure are available without departing from the novel scope of the present invention.

Increased weight and volume of packaging relative to the net food content translates to higher shipping costs and shelf space requirements. Therefore, in order to keep packaging overhead low, a compact SHFP heater device is preferred. However, a compact geometry means less surface area is available for heat transfer, which can be an important consideration in cases where the food to be heated is not readily stirred to provide convective heat transfer. Conductive heat transfer from a small heater to a larger mass of solid or non-stirrable food material will provide inefficient and uneven heating.

In order to overcome these limitations, the heater element of this invention may be implemented so that the heat it generates raises steam that distributes throughout the package interior and transfers sensible and latent heat (via condensation) to the food. The principle of using a chemical reaction to raise steam for heat transfer is efficiently used in the "flameless ration heaters" (FRH) used by the US Army to heat the "meal ready to eat" (MRE) field ration.

However, the FRH is a wet system based on mixing magnesium metal powder with water and is not well suited to widespread consumer use, whereas in the present invention, the water to be vaporized is not a component of the dry reaction mixture. Rather a small quantity of water is maintained in contact with the outer surface of the heater. For example, the cylindrical heater design of FIG. 3 could be wrapped in a dampened wicking material or located in a small condensate sump in the base of the package. The combustion characteristics of the heater are designed so that in operation, the exterior surface of the heater maintains a temperature sufficient to vaporize water to steam.

Applications of the present invention are not limited to the SHFP applications described above. A heating component in accordance with the present invention could be incorporated into a wide array of applications where heating would be desirable such as camping equipment as noted above or gloves for skiers or mountain climbers.

Figure 12:
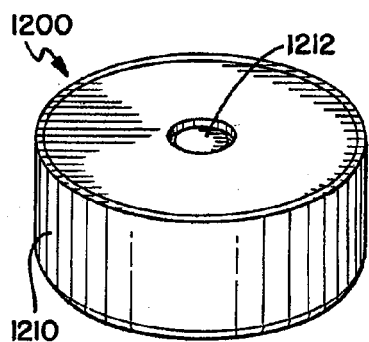
FIG. 12 is a perspective view of a particular embodiment of a modular heating element.

The principles of the invention can be applied to provide a modular heating element, such as a modular heating element 1200 as shown in FIG. 12, which can be provided in numerous forms and incorporated into a variety of devices, containers, or the like to provide a source of heat. The modular heating element 1200 as shown in FIG. 12 has a form in a general disc shape. While other shapes are contemplated, the general disc shape is particularly suitable for integration into container and packaging forms generally available in the food and beverage industry, such as, for example, soup cans, beverage containers, "instant" or "travel" style food container forms, or the like. The heating element 1200 includes a housing 1210 and an activation mechanism 1212, which provides activation of the heating element 1200 and initiates production of heat by a chemical reaction in accordance with the principles of the present invention.

Figure 13:
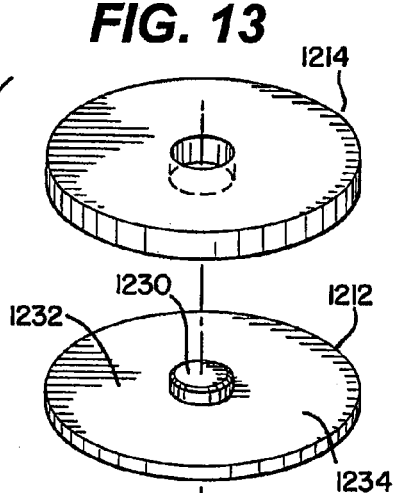
FIG. 13 is an exploded assembly view of the modular heating element depicted in FIG. 12.
Figure 14A:
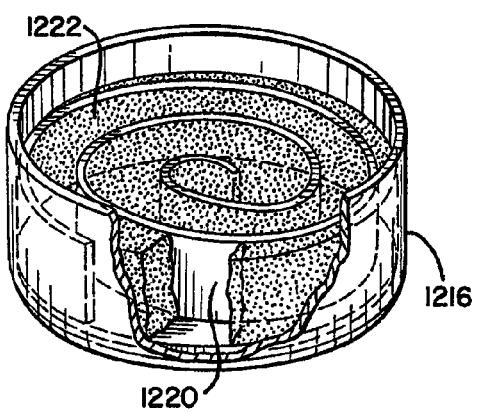
FIG. 14A is a perspective breakaway view of the modular heating element of FIG. 12 having the lid, inert material layer, and activation button removed.

Referring to the exploded assembly view of FIG. 13, the housing 1210 of the heating element 1200 preferably includes a lid 1214 and a container portion 1216, which define an exterior shape of the heating element 1200 and an interior space 1218. In this particular embodiment, a reaction regulator element 1220 is disposed within the container portion 1216 such that when the container portion 1216 is filled with a solid-state chemical heating composition 1222, as shown in FIG. 14A, the reaction regulator element 1220 is embedded within the composition 1222 to define a reaction path. As shown in FIGS. 13 and 14A, the reaction regulator element 1220 has a spiral-like shape defining a spiral-like reaction path. However, other geometries can be employed as well to define various path shapes, lengths and thicknesses, and are contemplated in accordance with the principles of the invention. In addition to adjustment of variables within the composition, such as for example, particle shape and size, composition ratios, etc., the reaction regulator element 1220 can be optimized to impart desired regulation and control over the reaction or burn path and rate of reaction, and hence, burn time, within the composition 1222. For example, the spiral-like shape of the reaction regulator element 1220 has been shown to provide a consistent and more regular burn pattern emanating from the center of the disc-like shape to which the composition 1222 has been formed. In a preferred embodiment, the reaction regulator element 1220 is made of a thin metal strip, such as steel, however, numerous other materials may be employed that are suitable to effectively perform the function of defining a reaction path with the given composition.

Figure 14B:
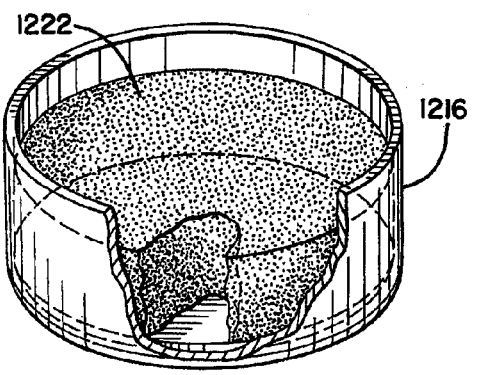
FIG. 14B is a perspective breakaway view of an alternate embodiment of the modular heating element of FIG. 12 that does not utilize a reaction regulator element, the view of the embodiment shown without the lid and inert material layer.
Figure 14B:
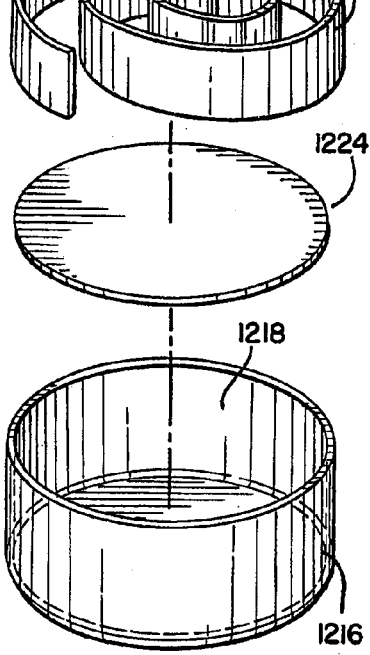

While embodiments incorporating the reaction regulator element 1220 may be desirable in certain applications, it is to be understood that it may be desirable in some applications to forego use of the reaction regulator element 1220, particularly in cost sensitive applications. Furthermore, as already noted above, burn rates and paths, and heat generation rates may be optimized via adjustment of variables within the composition, such as for example, particle shape and size, composition ratios, etc. In such embodiments, the reaction composition 1222 is disposed within the container portion 1216 as shown in FIG. 14B, wherein the reaction would initiate generally in a central portion of the reaction composition 1222 and propagate generally radially outward therefrom. It should be understood that the embodiment illustrated in FIG. 14B may be employed in connection with any of the descriptions herein with respect to embodiments incorporating the reaction regulator element 1220 (such as that illustrated in FIG. 14A), and accordingly should not be excluded from consideration in connection with such descriptions.

Returning to FIG. 13, the heating element 1200 preferably employs at least one inert material element 1224, and in the embodiment shown in FIG. 13, two inert material elements 1224, disposed between the composition 1222 and the housing 1210 to prevent short circuiting of the reaction path between sections of the reaction regulator element 1220. Without incorporating inert material elements 1224, there is an increased probability that the reaction front may "jump" over one or more portions of the reaction regulator element 1220 and thereby initiate other reaction fronts. In a preferred embodiment, the inert material elements 1224 are made of silica, alumina, ceramic, clay or metal, however, numerous other materials may be employed that are suitable to effectively prevent short circuiting of the reaction path between sections of the reaction regulator element 1220. The inert material 1224 disposed adjacent the activation mechanism preferably has thermally insulative properties to minimize the amount of heat transfer through the activation mechanism 1212 to a user's hand. The other inert material 1224 preferably has generally thermally resistive qualities to allow heat transfer through the container portion 1216 and ultimately into a container space containing a substance to be heated, such as a food or beverage. The thickness and thermal properties of the inert material layers as well as the housing components, such as the container portion 1216 and the lid 1214, may be adjusted to govern the rate of heat dissipation and the temperature of the exterior surfaces of the heating element 1200. It should be understood that the inert layers, while illustrated as flat disc-shaped layers, may also be configured to encapsulate or substantially encapsulate the composition 1222 in some embodiments to further regulate heat dissipation and the temperature of the exterior surfaces of the heating element 1200. It should also be understood that the inert layers can be disposed exterior to the heating element between the heating element and the heating device, package or container, or can be incorporated in whole or in part in the heating device, package or container. Additionally, in certain embodiments, the inert layers may not be utilized and instead the heating properties are adjusted via dimensional or material composition adjustment of the housing elements and/or the composition 1222.

The activation mechanism 1212 shown in the particular embodiment illustrated in FIG. 13 includes an actuator 1230 and a housing 1232. The housing 1232 includes an assembly flange 1234 to assist in positioning and assembly of the activation mechanism 1212 with respect to the other portions of the heating element 1200. The housing also facilitates a modular design of the activation mechanism 1212 such that it can be treated as a "drop-in" sub-assembly to the heating element 1200. However, in other embodiments, it is contemplated that the activation mechanism 1212 can be designed without the use of a housing or can be integrated with one or more other components of the heating element 1200. It is contemplated that, in some embodiments, the activation mechanism can be integrated with a component that can be assembled to the heating element 1200 so that prior to such assembly, the heating element cannot be activated. As shown in FIG. 13, the inert material element 1224 adjacent to the activation mechanism 1212 includes an aperture 1236 to allow the activation mechanism 1212 to be in communication with the composition. As shown in FIGS. 12 and 13, the actuator 1230 is actuable exteriorly from the housing 1210.

Figure 15A:
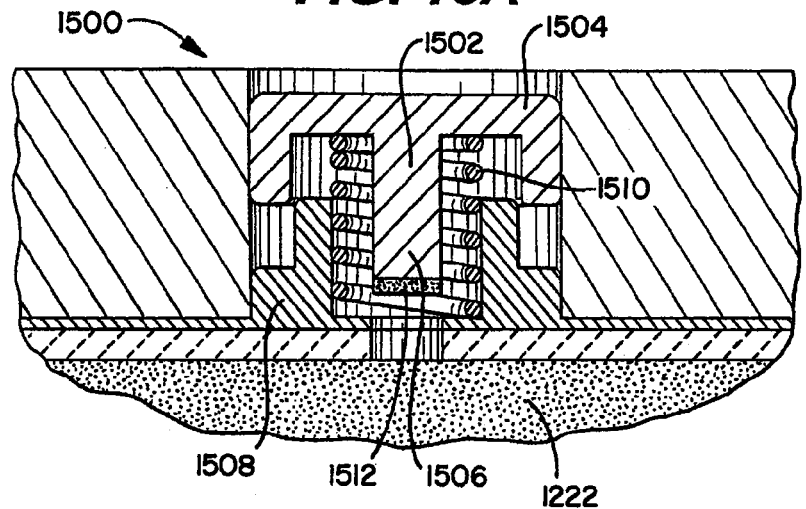
FIG. 15A is a partial cross-sectional view of a particular embodiment of an activation assembly disposed on an inert material layer and heater composition component of a modular heating element.

FIGS. 15A-G illustrate several different embodiments of an activation mechanism suitable for use in the heating element 1200. However, other embodiments may be utilized as well, including without limitation, other mechanisms disclosed herein, such as those illustrated in FIGS. 6-9 and FIG. 20. An activation mechanism 1500 is shown in FIG. 15A that employs a push-button type mechanism. As shown in FIG. 15A, the activation mechanism 1500 comprises an actuator 1502 having a user interface portion 1504 and an actuation portion 1506, and a housing 1508. A spring 1510 is disposed within the housing 1508 such that it acts upon the actuator 1502 to facilitate movement of the actuation portion 1506. As shown in FIG. 15A, when a user applies a force to the user interface portion 1504 of the actuator 1502 to overcome the spring force provided by the spring 1510, the actuation portion 1506 travels toward the composition 1222 and ultimately initiates contact therewith. The actuation portion 1506 preferably includes a carrier 1512 to carry a reaction initiation material that, when it contacts the composition 1222, initiates a contemplated chemical reaction based on the particular composition 1222. In a preferred embodiment, the reaction initiation material carrier 1512 comprises a fibrous material disposed on the actuation portion 1506. The fibrous material prevents reaction initiation materials in liquid form and of relatively low viscosities from dripping from the actuation portion 1506 and prematurely activating the contemplated chemical reaction. In a preferred embodiment, the chemical composition 1222 comprises a modified $Al/FeO_x$ or $Al/SiO_2$ thermite system as previously described herein. In a particular embodiment, a starter composition is disposed adjacent the actuator 1506 at a point of anticipated contact therewith to help initiate the contemplated chemical reaction within the chemical composition 1222. In a preferred embodiment, the starter composition is potassium permanganate or other strong oxidizer and the reaction initiation material is glycerin, glycerol, glycol or other liquid polyalcohol. In a preferred embodiment employing liquid reaction initiation material, approximately 2-20 µl, and more preferably approximately 10 µl, of reaction initiation material is utilized. In the case of glycol and other similar compounds, such amounts minimize $CO_2$ generation and hence pressure build-up in the heating element 1200.

Figure 15B:
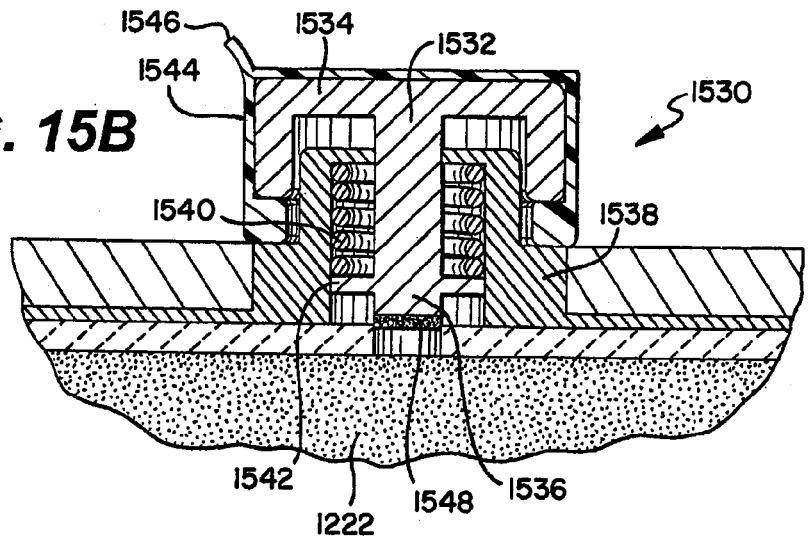
FIG. 15B is a partial cross-sectional view of another embodiment of an activation assembly disposed on an inert material layer and heater composition component of a modular heating element.

FIG. 15B illustrates another embodiment of an activation mechanism in the form of activation mechanism 1530. The activation mechanism 1530 employs a trigger mechanism. As shown in FIG. 15B, the activation mechanism 1530 comprises an actuator 1532 having a user interface portion 1534 and an actuation portion 1536, and a housing 1538. A spring 1540 is disposed within the housing such that it acts upon the actuator to facilitate movement of the actuation portion. In this embodiment, the spring 1540 is preloaded against a spring flange 1542 of the actuator 1532 and the actuator 1532 is held in place against the force of the spring 1540 by a removable release element 1544. The release element includes a pull tab 1546 to facilitate removal by a user. When the release element is removed, the spring causes the actuation portion 1536 to travel toward the composition 1222 and ultimately initiate contact therewith. As with the embodiment shown in FIG. 15A, the actuation portion preferably includes a carrier 1548 to carry a reaction initiation material that, when it contacts the starter composition, initiates a contemplated chemical reaction based on the particular composition 1222.

Figure 15C:
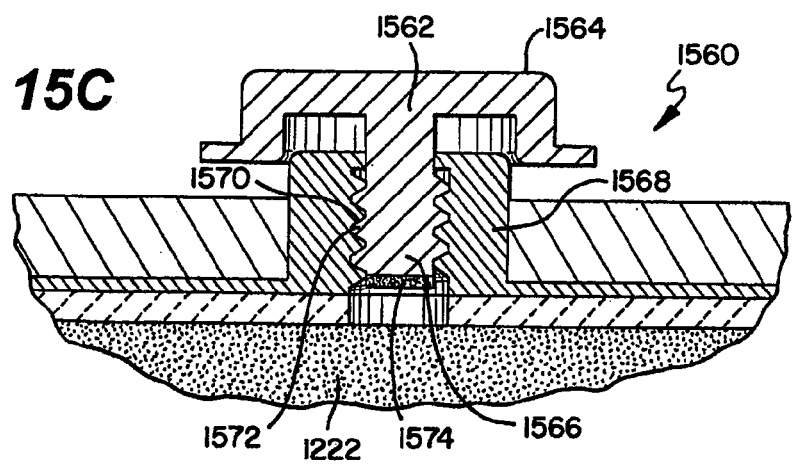
FIG. 15C is a partial cross-sectional view of yet another embodiment of an activation assembly disposed on an inert material layer and heater composition component of a modular heating element.

FIG. 15C illustrates yet another embodiment of an activation mechanism in the form of activation mechanism 1560. The activation mechanism 1560 employs a screw-type mechanism. As shown in FIG. 15C, the activation mechanism 1560 comprises an actuator 1562 having a user interface portion 1564 and an actuation portion 1566, and a housing 1568. The housing 1568 has a threaded portion 1570 and the actuator 1562 has a mating threaded portion 1572 to facilitate movement of the actuation portion 1566 when the actuator 1562 is turned by a user. When the actuator 1562 is turned, the actuation portion 1566 travels toward the composition 1222 and ultimately initiates contact therewith. As with the embodiment shown in FIGS. 15A and B, the actuation portion 1566 preferably includes a carrier 1574 to carry a reaction initiation material that, when it contacts the starter composition, initiates a contemplated chemical reaction based on the particular composition 1222.

Figure 15D:
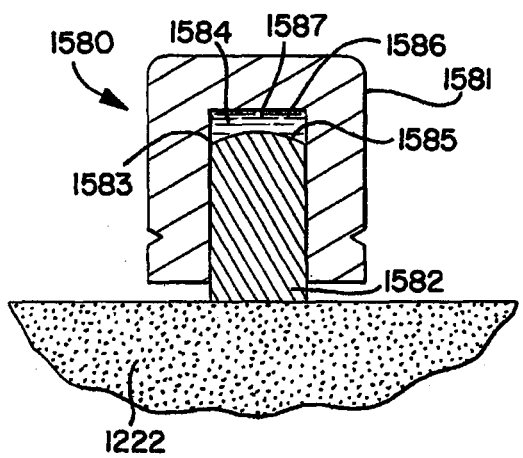
FIG. 15D is a partial cross-sectional view of yet another embodiment of an activation assembly disposed on a heater composition component of a modular heating element, the assembly shown in an unactuated state.
Figure 15E:
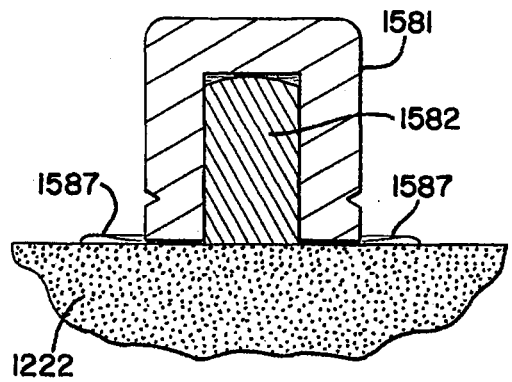
FIG. 15E is a partial cross-sectional view of the activation assembly embodiment of FIG. 15D in an actuated state.

FIGS. 15D-G illustrate activation mechanisms that employ the concept of hydraulic action to force a reaction initiation material in liquid form toward a fuel composition, such as the composition 1222. As shown in FIG. 15D, the aforementioned concept may be employed via a piston-type activation mechanism 1580, which includes an actuator 1581 slidingly engaged to a piston 1582, which protrudes into a cavity 1583 formed in the actuator 1581. In an unactuated position, such as that shown in FIG. 15D, a space 1584 exists between an end 1585 of the piston 1582 and an end surface portion 1586 of the cavity 1583, thereby creating a reservoir for a liquid or other flowable reaction initiation material 1587. During actuation, the actuator 1581 is pressed by a user to cause the actuator 1581 to slide along the piston 1582, which in turn applies a compression force to the reaction initiation material 1587. Hydraulic pressure causes the reaction initiation material to be forced out of the cavity 1583 between the piston 1582 and a wall of the cavity 1583, and contact the composition 1222 to initiate reaction. A fully actuated position is illustrated in FIG. 15E.

The actuator 1581 can be crimped to the piston 1582 to provide sliding engagement therebetween while still allowing the liquid reaction material 1587 to pass or seep therebetween upon application of hydraulic pressure via compression of the liquid reaction material 1587 by action of the piston 1582 against the liquid reaction material within the reservoir of the cavity 1583. Other engagement arrangements may be applied as well, such as, for example, mechanical fastening, friction fit, or other known mechanisms suitable to allow the actuation mechanism 1580 to function accordingly. In an alternate embodiment (not shown), the piston 1582 may include a passage therein to provide fluid communication between the reservoir and the composition 1222. In such an embodiment, for example, the passage may be a bore within the piston 1582 such that when the actuator is pressed, the liquid reaction material 1587 is forced primarily or solely through the passage rather than between the piston 1582 and the wall of the cavity 1583. Furthermore, in such an embodiment, a frangible seal may be disposed over an opening of the passage or within the passage to prevent communication of the liquid reaction material therethrough until a force is applied to the actuator to create a hydraulic pressure sufficient to rupture the seal.

Figure 15F:
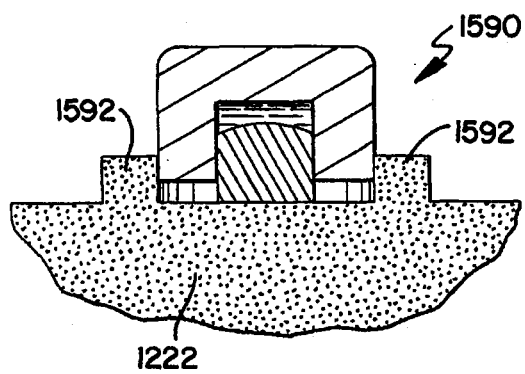
FIG. 15F is a partial cross-sectional view of yet another embodiment of an activation assembly disposed on a heater composition component of a modular heating element.
Figure 15G:
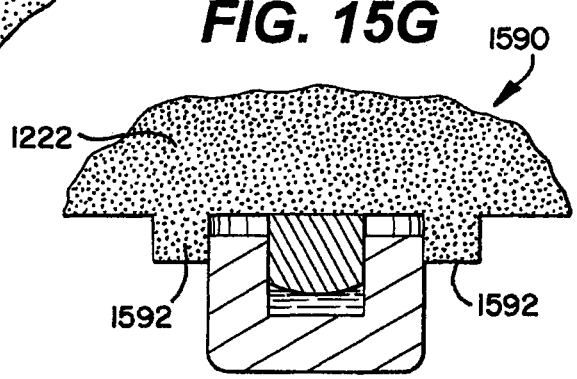
FIG. 15G is a partial cross-sectional view of the activation assembly of FIG. 15F in an inverted position.

Another embodiment of an activation mechanism is illustrated in FIGS. 15F and G as an activation mechanism 1590. This embodiment is similar to that illustrated in FIGS. 15D and E, the primary difference being that the composition 1222 includes a retaining portion 1592 formed therein to facilitate contact of the liquid reaction material with the composition 122, especially in circumstances where the activation mechanism 1590 may be incorporated into a modular heating element that may be inverted via its placement within a particular package or container, or via a user inverting the package or container during the activation process. The activation mechanism 1590 is shown in an inverted position in FIG. 15G. The retaining portion 1592 increases surface area for contact between the liquid reaction material and the composition 1222.

The activation mechanism embodiments shown in FIGS. 15D-G are particularly suitable in applications where the heating element 1200 may pass through a retort process, such as in certain canned food applications. In an embodiment where the liquid reaction material is ethylene glycol, the boiling point for ethylene glycol is 197° C., which is sufficient to withstand retort.

Figure 16:
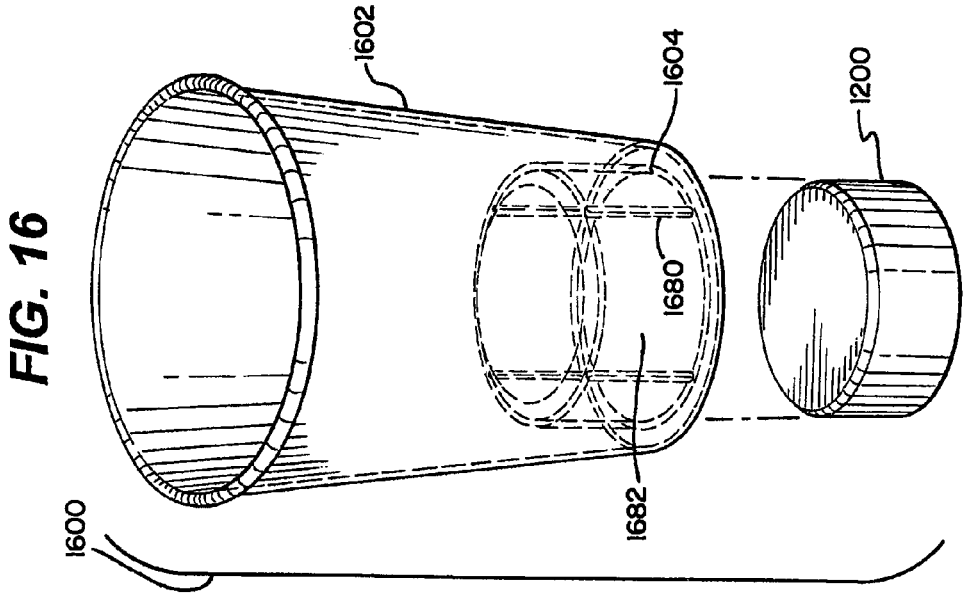
FIG. 16 is an exploded assembly view of a particular embodiment of a package heating apparatus in the form of a beverage cup having a formation to accommodate a modular heating element.

The modular heating element 1200 can be employed in a variety of contexts, including but not limited to mass produced consumer food and beverage containers. As illustrated in FIG. 16, a package heating apparatus or device 1600 is provided with a beverage container 1602 and a heating element 1200. The beverage container 1602 is formed with a pocket 1604 to accommodate the heating element 1200. For ease of illustration, only the beverage container 1602 and the heating element 1200 are illustrated, with the understanding that other components may be included as well, such as, for example, a safety seal covering the actuator of the activation mechanism and a product seal or other product packaging requirements. The heating element 1200 may be configured to be press fit into the pocket 1604 during a manufacturing process. In other embodiments, the heating element 1200 may be adhered or otherwise suitably secured to the beverage container 1602. Of course, consistent with other embodiments disclosed herein, the heating element 1200 may be fully integrated with the beverage container 1602.

Figure 17:
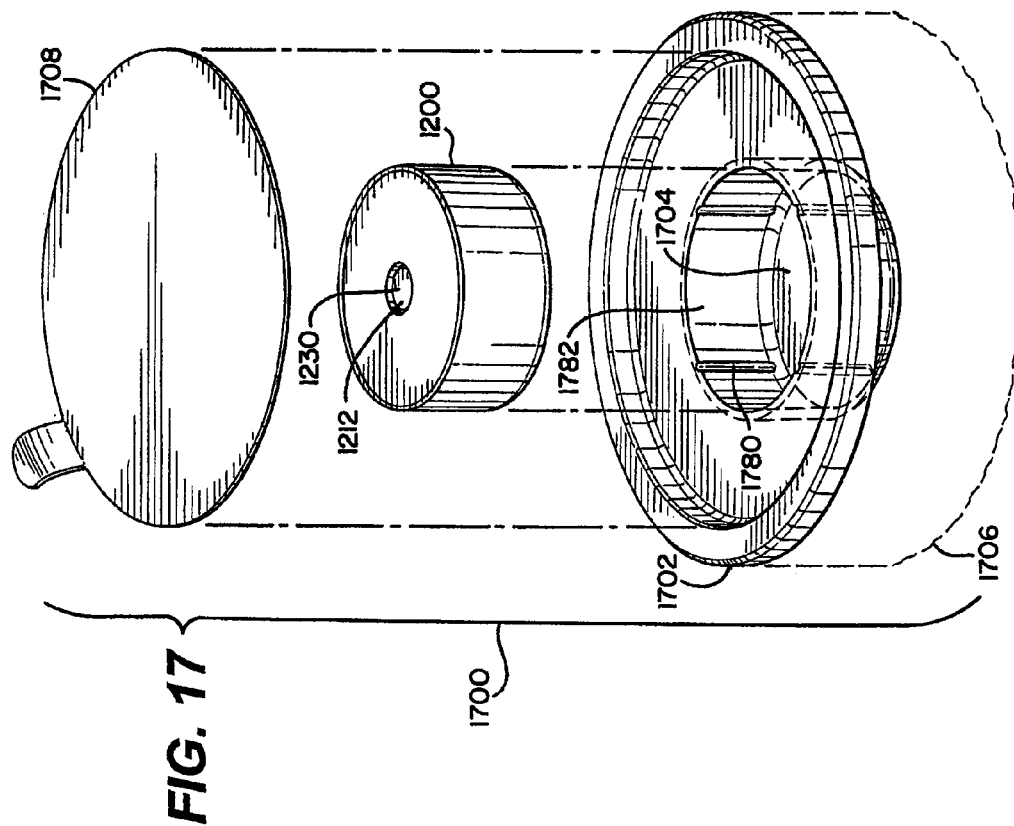
FIG. 17 is an exploded assembly view of a particular embodiment of an end portion of a package heating apparatus having a formation to accommodate a modular heating element and a safety seal.

FIG. 17 illustrates an exemplary package heating device 1700, which is particularly suitable for canned food items, such as soup or chili. In this embodiment, a container end 1702 is provided with a pocket 1704 configured to accept the heating element 1200. The container end 1702 is designed to be formed onto a container cylinder 1706 (partially shown in phantom line) to form a bottom portion of the heating device 1700. Thus, the heating element 1200 is disposed on the bottom of the heating device 1700. A safety seal 1708 is preferably applied to the container end 1700 to cover the heating element 1200 and thus, the actuator 1230 of the activation mechanism 1212 to prevent accidental activation. With both embodiments, the heating element 1200 is designed such that it can be assembled to the food or beverage packaging container at any point in the manufacturing process, including before any autoclaving process, such as that typically applied in canned food processes. Furthermore, the container end 1702 is designed such that it can be provided as a sub-assembly already containing the heating element 1200 and safety seal 1708. In such an application, the container end sub-assembly can be formed onto the container cylinder 1706 without the need for further assembly with respect to the heating element 1200.

Referring again to the embodiments of FIGS. 16 and 17, each of the pockets are provided with at least one, and preferably a plurality, of respective channels 1680, 1780 along a respective sidewall 1682, 1782 of each of the pockets 1604, 1704. These channels 1680, 1780 provide a venting mechanism for the heating element 1200 during the chemical reaction to allow any resulting gases to escape and prevent air lock within the pockets 1604, 1704.

Although not shown in the drawings, any of the devices, containers or packages may be configured with a reservoir in communication with the heating element and in communication with the interior portion of the device, container or package that contains the substance to be heated, wherein the reservoir holds an amount of water that, upon activation of the heating element, generates steam that may be used in the heating and preparation of the substance. Such a configuration would be particularly suitable for heating food items such as, for example, rice and pasta.

As noted above, the heating element 1200 may be configured to be fit into an associated pocket of a device, container or package during a manufacturing process or as a modular addition to a reusable device, container or package. Mechanisms for engagement between the heating element and the container or package include, but are not limited to, friction or press fit into an associated pocket or opening; adhesion to the container or package by use of a suitable adhesive; or snaps, retaining elements, fasteners, other mechanical arrangements or the like. Again, consistent with other embodiments disclosed herein, the heating element 1200 may be fully integrated with the container or package.

An additional embodiment of an exterior package configuration for a heating element is illustrated in FIG. 18 as a heating element 1800. In this particular embodiment, the heating element 1800 includes a housing 1810, which further includes a lid 1812 and a container portion 1814, together generally defining an exterior shape of the heating element 1800. As shown in FIG. 18, the container portion 1814 includes a retaining groove 1816 for use in connection with a retaining mechanism for assembly within a pocket of a container or package. As shown in FIG. 19, an exemplary package heating device 1900, which is particularly suitable for canned food items, includes a container end 1902 with a pocket 1904 configured to accept the heating element 1800. The container end 1902 is designed to be formed onto a container cylinder 1906 (partially shown in phantom line) to form a bottom portion of the heating device 1900. As shown in FIG. 19, the pocket 1904 includes a retaining ridge 1908 that correspondingly mates with the retaining groove 1816 of the heating element 1800 when assembled. In such an arrangement, the retaining groove and the retaining ridge can be dimensioned appropriately to provide a desired fit. Preferably, in this particular embodiment, the retaining mechanism will not allow disassembly without undue effort or the use of special tools.

As described above, the modular heating element can make use of any number of activation mechanisms contemplated herein. In another exemplary embodiment illustrated in FIG. 20, a heating element 2000 is provided utilizing a resistive heating activation concept. In accordance with this concept, the heating element includes a housing 2002, which further includes a lid 2004 and a container portion 2006, together generally defining an exterior shape of the heating element 2000 and an interior portion for housing a chemical heating composition as previously described. In this embodiment, the heating element 2000 includes a pair of terminals 2008 in communication with a resistive heating component 2010, which is in contact with the composition, and preferably embedded therein to ensure proper activation. While capable of being utilized in any configuration contemplated herein, this arrangement is particularly suitable for use in modular applications where the heating element 2000 is provided for use in connection with reusable heating devices. Although not shown, application of this embodiment includes a power source, such as a battery, which provides adequate voltage to allow the resistive heating component 2010 to achieve appropriate temperatures. In a particular embodiment, a starter composition may be disposed around the resistive heating component to help initiate the contemplated chemical reaction within the chemical composition. In other embodiments, as already described, a piezoelectric igniter may be utilized in a similar configuration to that illustrated in FIG. 20.

It is noted that while the descriptions herein may make use of the terms package, container, device, etc. to describe numerous forms of a vessel for holding a substance to be heated in accordance with the principles of the invention, including reusable, recyclable, and disposable vessels, it should be understood that each of these terms is intended to cover all such embodiments in a non-limiting manner.

Again, it is noted that applications of the invention are not limited to the SHFP applications described above. A heating component or modular heating element in accordance with the present invention, such as the heating element described above, could be incorporated into a wide array of applications where heating would be desirable.

While one or more specific embodiments have been illustrated and described in connection with the present invention, it is understood that the present invention should not be limited to any single embodiment, but rather construed in breadth and scope in accordance with recitation of the appended claims.

What is claimed is:

1. A heating device comprising:
  a heating chamber defining an interior space for receiving and storing a substance to be heated;
  a reaction chamber disposed within the heating chamber;
  a solid state thermite reaction composition disposed within the reaction chamber such that it is physically isolated from and in thermal communication with the interior space of the heating chamber, the solid state thermite reaction composition comprising a mixture of a fuel component, an oxide component of a principal heat generating thermite reaction that contributes an inherently self-extinguishing reaction character, an accelerant that reduces the activation energy of the overall reaction composite to produce a controlled reaction, and a thermal diluent;

an activation mechanism having an actuator, the activation mechanism capable of communication with the composition disposed within the reaction chamber, wherein the reaction chamber is in the form of a modular heating element that contains the reaction composition and the activation mechanism, further comprising a heating element pocket formed within the heating chamber to accept the modular heating element, wherein the heating element pocket has at least one vent channel formed therein;

wherein the reaction composition is inert until the activator mechanism is actuated.

2. The heating device of claim 1, wherein the pocket is accessible exterior to the heating chamber.

3. The heating device of claim 1, wherein the heating chamber comprises an open-ended container portion and an end portion that are joined together to form the heating chamber and define an exterior of the heating device.

4. The heating device of claim 1, wherein the heating device is in a form of a soup container.

5. The heating device of claim 1, wherein the heating chamber comprises an open-ended container portion having an open end, an opposing end and a removable lid covering the open end, the open-ended container portion having the heating element pocket formed in the opposing end.

6. The heating device of claim 5, wherein the heating chamber is in a form of a beverage container.

7. The heating device of claim 5, wherein the heating chamber is in a form of a soup container.

8. A heating element for use as a source of heat, the heating element comprising:
a housing defining an exterior shape of the heating element and an interior space;
a solid-state chemical heating composition disposed within the interior space, the solid state thermite reaction composition comprising a mixture of a fuel component, an oxide component of a principal heat generating thermite reaction that contributes an inherently self-extinguishing reaction character, an accelerant that reduces the activation energy of the overall reaction composite to produce a controlled reaction, and a thermal diluent;
an activator mechanism capable of communication with the composition and having an actuator and disposed within the housing such that the actuator is actuable exteriorly from the housing;
wherein the composition is disposed in a reaction chamber in the form of a modular heating element that contains the composition and the activator mechanism, further comprising a heating element pocket formed within the housing to accept the modular heating element, wherein the heating element pocket has at least one vent channel formed therein; and
wherein the activator mechanism initiates a chemical reaction within the composition when actuated.

9. The heating element of claim 8, further comprising a reaction regulator element embedded within the composition to define a reaction path.

10. The heating element of claim 9, further comprising an inert material element disposed between the composition and the housing to prevent short circuiting of the reaction path.

11. The heating element of claim 9, wherein the reaction regulator element has a spiral-like shape to define a spiral-like reaction path.

12. The heating element of claim 8, wherein the exterior shape of the heating element is generally disc-shaped.

13. A heating device comprising:
a heating chamber defining an interior space for receiving and storing a substance to be heated;
a reaction chamber disposed within the heating chamber;
a solid state thermite reaction composition disposed within the reaction chamber such that it is physically isolated from and in thermal communication with the interior space of the heating chamber, the solid state thermite reaction composition comprising a mixture of a fuel component, an accelerator, an oxidizer and a thermal diluent; and
an activation mechanism having an actuator, the activation mechanism being separate from, but capable of thermal communication with, the composition disposed within the reaction chamber, wherein the reaction chamber is in the form of a modular heating element that contains the reaction composition and the activation mechanism, further comprising a heating element pocket formed within the heating chamber to accept the modular heating element, wherein the heating element pocket has at least one vent channel formed therein;
wherein the reaction composition is inert until the activator mechanism is actuated.

14. The heating device of claim 13, wherein the fuel is aluminum, the accelerator is a strong oxidizer, and the oxidizer is silicon dioxide.

15. The heating device of claim 13, wherein the fuel is aluminum, the accelerator is potassium chlorate, the oxidizer is a combination of silicon dioxide and iron oxide, and the thermal diluent is a nanoclay.

16. The heating device of claim 13, wherein the oxidizer in the mixture has a dense form and further including a second oxidizer portion in the mixture having a high surface area form.

17. The heating device of claim 13, further including a fluxing agent.

18. The heating device of claim 13, wherein the activation mechanism is a pyrophoric iron/air couple and the actuator is a seal which, when removed, exposes the pyrophoric iron to air to generate heat to initiate a thermite reaction in the solid state thermite reaction composition.

19. The heating device of claim 13, wherein the activation mechanism is a combination of potassium permanganate and glycerin.

20. The heating device of claim 13, wherein the activation mechanism comprises an actuator having a user interface portion, an actuation portion having a starter composition that initiates a chemical reaction with the thermite reaction composition, and a housing, wherein a spring is disposed within the housing to facilitate movement of the actuation portion, and wherein force applied by a user to the user interface portion moves the actuation portion toward the thermite reaction composition and ultimately makes contact therewith, thereby initiating a thermite reaction in the solid state thermite reaction composition.

* * * * *